(12) United States Patent
Winter et al.

(10) Patent No.: US 6,711,497 B1
(45) Date of Patent: *Mar. 23, 2004

(54) METHOD FOR OPERATING A NAVIGATIONAL SYSTEM

(75) Inventors: Stephan Winter, Hannover (DE); Bernd Hessing, Holle (DE); Thomas Jung, Frankfurt (DE); Walter Nordsiek, Holle (DE); Olaf Binnewies, Hildesheim (DE); Thomas Fabian, Hildesheim (DE); Bettina Rentel, Giesen (DE); Dirk Otte, Laatzen (DE); Dirk Tiemann, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/169,447

(22) PCT Filed: Nov. 4, 2000

(86) PCT No.: PCT/DE00/03877

§ 371 (c)(1),
(2), (4) Date: Oct. 11, 2002

(87) PCT Pub. No.: WO01/50437

PCT Pub. Date: Jul. 12, 2001

(30) Foreign Application Priority Data

Dec. 30, 1999 (DE) .......................... 199 63 765

(51) Int. Cl.[7] ............................................. G01C 21/32
(52) U.S. Cl. ........................ 701/208; 701/209; 707/100
(58) Field of Search ................................ 701/200, 201, 701/208, 209; 707/100

(56) References Cited

U.S. PATENT DOCUMENTS

| | | | |
|---|---|---|---|
| 5,699,255 A | | 12/1997 | Ellis et al. |
| 5,953,722 A | * | 9/1999 | Lampert et al. ............. 707/100 |
| 5,968,109 A | * | 10/1999 | Israni et al. ................. 701/208 |
| 6,415,227 B1 | * | 7/2002 | Lin ............................... 701/213 |
| 6,473,691 B1 | * | 10/2002 | Winter et al. ............... 701/208 |
| 6,504,571 B1 | * | 1/2003 | Narayanaswami et al. ....... 348/231.99 |

FOREIGN PATENT DOCUMENTS

| | | |
|---|---|---|
| EP | 0 838 764 | 4/1998 |
| EP | 0 935 227 | 8/1999 |
| EP | 0 947 850 | 10/1999 |

* cited by examiner

*Primary Examiner*—Gertrude A. Jeanglaude
(74) *Attorney, Agent, or Firm*—Kenyon & Kenyon

(57) ABSTRACT

A method for operating a navigational system having a digital map base which is a reproduction of real geographical regions and contains data on geographical elements, as well as a device which retrieves and processes data, such as an operating device having a display unit. In this context, a data directory of the data present in the digital map base is transmitted to the device which retrieves and processes data, and the device which retrieves and processes data selects data, to be requisitioned from the digital map base using this data directory.

15 Claims, 1 Drawing Sheet

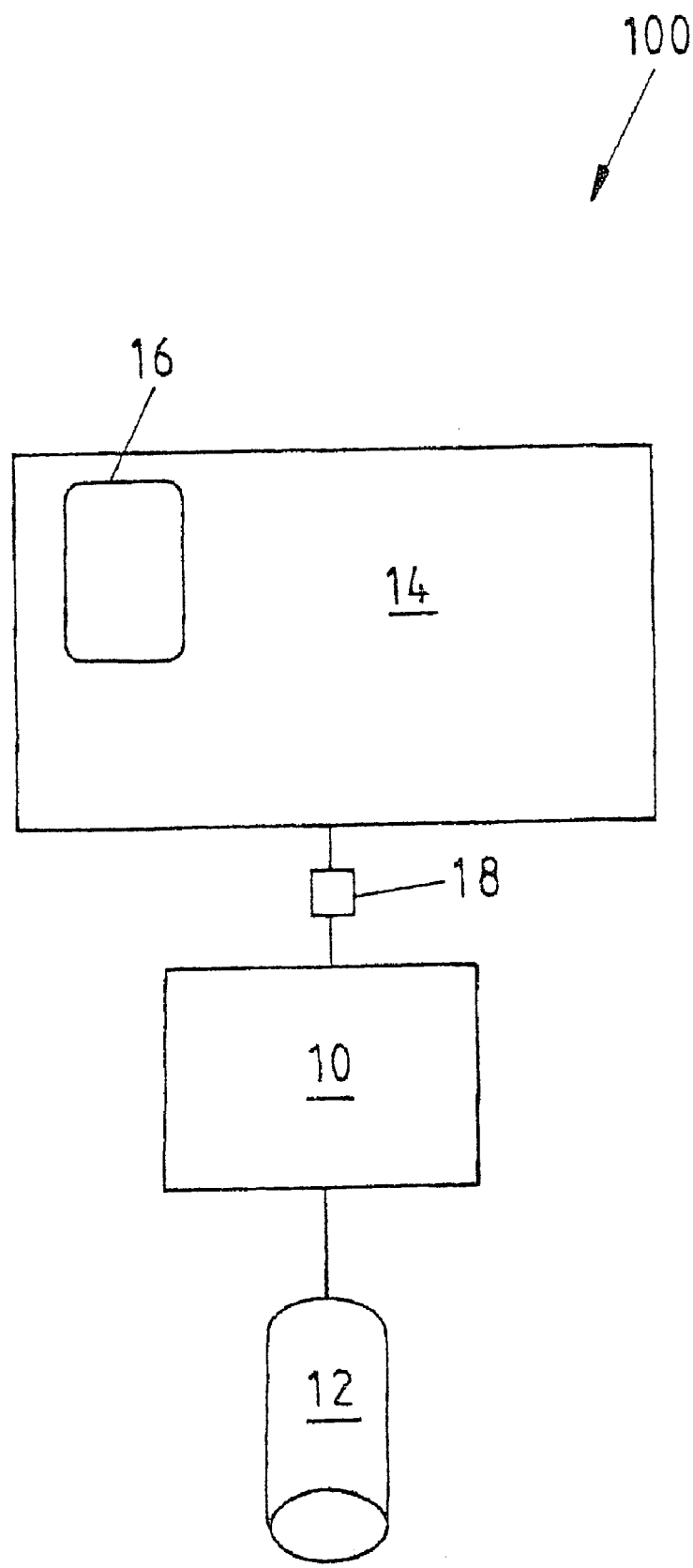

METHOD FOR OPERATING A NAVIGATIONAL SYSTEM

FIELD OF THE INVENTION

The present invention relates to a method for operating a navigational system having a digital map base which is a reproduction of real geographical regions including data on geographical elements and to a device which retrieves and processes the data, such as an operating unit having a display device. The present invention also relates to a navigational system for a means of transportation, particularly a motor vehicle, having a device making-available the data of a digital map base and a device, connected to it, which retrieves and processes data.

BACKGROUND INFORMATION

In means of transportation, such as motor vehicles, airplanes or ships, permanently installed navigational systems guide an operator of the means of transportation rapidly, simply and safely to a desired destination, without his having to plan a route previously and with much effort, or having to acquire appropriate map material and/or having to study it. For this, appropriate navigational data, based, for example, on maps of various kinds or road maps, are stored in the navigational system as a digital map base, for instance on CD-ROM. The navigational device uses, for example, GPS (Global Positioning System) to determine an instantaneous location and to calculate appropriate navigational directions leading to a predetermined destination. In this connection, the navigational data may include, for example, data on roads and ways for motor vehicles as well as more detailed geographical data such as hills, lakes, woods, land development and other topographical elements. More detailed data, such as restaurants, hotels, points of interest, may also be included in the navigational data.

The digital map base thus includes a reproduction of the real road network as well as the corresponding geographical surroundings. This data from the digital map base is displayed on an operating unit for the information of the driver via a display. The degree of detail, or rather the number of illustrated geographical features for maintaining clarity of representation in different situations may be selected differently. Thus, for example, on a general map, only express highways are shown, whereas an inner city map should show details up to residential development. This choice of details represented on the map substantially influences the clarity and readability of the maps produced on digital map bases, which is particularly important for illustrations in motor vehicles, since a driver should be able to grasp all the necessary data for route guidance at one glance if possible. In this situation, the map illustrations may not sensibly be produced according to generally fixed rules, but rather a relative weighting of the elements of the representation is necessary. For example, a general map of the Ruhr region would appropriately not be expected to include all express highways. By comparison, a map of Arizona, on the same scale, could sensibly include some very minor roads.

In the case of navigational systems for motor vehicles, it makes sense to separate the navigation module, which makes available the digital map base, from the devices making the display and also to develop them separately. For this, then, a predefined interface for access to the digital map base of the navigation module is necessary. This interface must make it possible to produce digital maps having good clarity to different scales in the displaying device.

Such interfaces are known, for example, coming from the firms NAVTECH (http://www.navtech.com) or Etak, Inc. (http://www.etak.com). These interfaces make possible access to the physical storage format of the digital map base. It is true, though, that different map bases are used in different vehicles. Additionally, access to the navigation module, such as for internal route computation, and for generating an illustration of a section of the digital map base on the display device, may present conflicts of access because of competitive access of different programs to a sequentially readable data storage (CD-ROM, DVD-ROM). Furthermore, the elements contained in the digital map bases are described "directly", i.e. that an express highway is a road of the classification "motorway" along with a number. It has become apparent that standardization and unification via classification of map elements is possible on only a very unsatisfactory level that is not suitable for generating an illustration.

Making data available for display on the display device on the operating unit of a navigational system is frequently done in the form of geographically defined page frames. In this context, a page frame network is composed of individual page frames of a digital map. The page frame network is formed by subdividing the earth's surface into a network of page frames of the same geographical extent for the map, comparable to the grid squares of a map printed as usual. To make possible differently detailed effects, several page frames are usually stored on one digital map. A coarse map illustration in a general network is produced using few page frames that are each greatly extended geographically. These, then, contain meaningful geographical data only for rough orientation. By contrast, a detail network includes many spatially small page frames, and is superposed on the general network. In the page frames of the detail network, for example, residential streets and other geographical data only of interest in the near region are included. Therefore, page frames of different extent and different content may be present in the digital map base at one geographical position. These mutually overlapping networks of page frames are also denoted as different page frame levels. In order to obtain certain data, the user or the operating device must request a page frame of the degree of detail desired from the digital map.

The operating device retrieves a page frame and shows this on the display device. Furthermore, the data contained in the page frame are used for route computation. On the one hand, this has the advantage that a simple determination of the data to be requisitioned from the digital map base is implemented by simply calling up one page frame and transmitting all the data on geographical elements contained in this page frame. Furthermore, decoupling of the video screen section and data administration is achieved. On the other hand, however, a considerable disadvantage of the page frames is that possibly interesting data or information outside each page frame, or at the edge of the page frame, are not available, since these are cut of with the aid of so-called "clipping", and are not transmitted. Also, data at the edges of page frames possibly have to be computed for route computation. Beyond that, the operating unit has no information of any kind concerning what is stored in which page frame, and thus cannot retrieve digital data from the map base in a targeted manner.

SUMMARY OF THE INVENTION

It is the object of the present invention to make available an improved method which will remove the disadvantages mentioned above and will make available a more targeted access to data of a digital map base.

To achieve this for the method of the kind mentioned above, the present invention provides that a data directory of the data present in the digital map base is transmitted to the device retrieving and processing the data, and that the device retrieving and processing the data selects the data to be requested from the digital map base with the aid of this data directory.

This has the advantage that the application in the device retrieving and processing the data is decoupled from the physical data storage. Furthermore, the device retrieving and processing the data may retrieve data from the digital map base in a targeted way, without being limited to block-wise or page frame-like summaries of the data in the digital map base.

For instance, data in the digital map base are summarized in the form of geographically defined page frames and a data directory with respect to contents of individual page frame levels is transmitted to the device retrieving and processing data.

Expediently, by using the data directory, data with respect to road classification, size of locality, railroad lines, buildings, bridges, etc, contained in the digital map base, and with respect to different coding instructions contained in the digital map base are transmitted. Codings of traffic data, such as GATS geocodes or TMC location codes are transmitted optionally.

The method according to the present invention is advantageous when the digital map base has different levels that each have differently detailed data contents of the same geographical region, the different data contents of the different levels being transmitted using the data directory.

Furthermore, in a navigational system of the present invention, the present invention provides that the device making available data of the digital map base is configured to make available to the device retrieving and processing data a data directory of the data contained in the digital map base, the device retrieving and processing data being configured in such a way that it selects data to be transmitted from the digital map base to the device retrieving and processing data, using the data directory. This has the advantage that the application in the device retrieving and processing the data is decoupled from the physical data storage.

Furthermore, the device retrieving and processing data may retrieve data from the digital map base in a targeted way, without, in this context, being limited to block-wise or page frame-like summations of the data in the digital map base.

For this, for example, the device making available data of the digital map base is a navigation module, and the device retrieving and processing data is an operating unit.

Alternatively, the device making available data of the digital map base may be a data server of a telematic service provider, and the device retrieving and processing data may be a means of locomotion.

In one embodiment, the digital map base has various map levels which each have different data contents of the same geographical region, different information contents of the different levels being included in the data directory.

BRIEF DESCRIPTION OF THE DRAWINGS

FIG. 1 shows a block diagram of a sub-system of a navigational system according to the present invention.

DETAILED DESCRIPTION

Navigational system 100, shown in FIG. 1, includes a navigational module 10 having a digital map base 12 and an operating device 14 having a display device 16, such as an LCD flat screen. Between operating device 14 and navigational module 10 an interface 18 is arranged.

The data supplier in the form of navigational module 10 makes available a "data directory", service. In the data directory, all the data contents available from databank 12 are listed along with the associated methods. When access is made via page frames, the different contents of individual "page frame levels" are made known by the directory service. The requisitioning device in the form of operating device 14 may then requisition page frames of different levels based on its own arbitrary criteria. Applications in operating device 14 and the physical data storage in digital map base 12 are decoupled from each other.

The content directory or data directory contains, for example road classifications, the size of localities, rail lines, buildings, bridges, etc, in digital map base 12. Simple and largely standardized codings are used for the data elements.

In other words, navigational module 10 makes available to operating device 14 data with regard to the data contents present in digital map base 12. For this purpose, too, several data fields that are independent of one another may be available in digital map base 12. These data fields are expediently connected with one another semantically, i.e. data in different data fields are identical with respect to their descriptive features. For example, the same methods are used for coding the geographical positions. Furthermore, for instance, identical character sets and the same rules are used as are used for coding street numbers.

Interface 18 can operate between operating device 14 and navigation module 10, as shown, and can also be used between a vehicle itself and a telematic service provider. Access to digital database 12 does not have to be carried out time-wise in a specific connection.

Content directories can be made redundant. If several competing coding instructions are present, each supported coding instruction in the content directory is expediently brought up. GATS geocodes or TMC location codes (ENV 12313-1) are examples of codings for traffic data.

What is claimed is:

1. A method for operating a navigational system, the navigational system including a digital map base, the digital map base including a reproduction of real geographical regions and data on geographical elements, the navigational system further including a first device for retrieving and processing data, the method comprising:
   transmitting a data directory of the data included in the digital map base to the first device; and
   at the first device, selecting data to be requisitioned from the digital map base using the data directory.

2. The method of claim 1, wherein the first device is an operating unit that includes a display device.

3. The method of claim 1, further comprising:
   organizing the data in the digital map base in a form of geographically defined page frames; and
   transmitting a data directory having information regarding contents of individual page frame levels to the first device.

4. The method of claim 1, further comprising:
   transmitting data regarding at least one of road classifications, sizes of localities, rail lines, buildings, and bridges included in the digital with aid of the data directory.

5. The method of claim 1, further comprising:
   transmitting data regarding coding instructions included in the digital map base using the data directory.

6. The method of claim 5, wherein the coding instructions include at least one of GATS geocodes and TMC location codes.

7. The method of claim 1, wherein the digital map base includes a plurality of levels, each level having detailed data contents of a particular geographical region, the method further including transmitting the data contents of each of the levels using the data directory.

8. A navigational system for a vehicle, comprising:

a first device configured to provide access to data from a digital map base and a data directory of the data contained in the digital map base; and a second device coupled to the first device configured to retrieve and process the data and the data directory provided via the first device, the second device further configured to select data to be acquired from the digital map base via the first device using the data directory.

9. The navigational system of claim 8, wherein the vehicle is a motor vehicle.

10. The navigational system of claim 8, wherein the first device is a navigation module, and the second device is an operating device.

11. The navigational system of claim 8, wherein the first device is a data server of a telematic service provider, and the second device is the vehicle.

12. The navigational system of claim 8, wherein the digital map base includes a plurality of levels, each level having detailed data contents of a particular geographical region, the information contents of each of the levels being included in the data directory.

13. The navigational system of claim 10, wherein the operating device includes a display device.

14. The navigational system of claim 8, further comprising:

an interface arranged between the first device and the second device.

15. The navigational system of claim 11, further comprising:

an interface arranged between the data server of the telematic service provider and the vehicle.

* * * * *

UNITED STATES PATENT AND TRADEMARK OFFICE
CERTIFICATE OF CORRECTION

PATENT NO. : 6,711,497 B1
DATED : March 23, 2004
INVENTOR(S) : Winter et al.

It is certified that error appears in the above-identified patent and that said Letters Patent is hereby corrected as shown below:

Column 1,
Line 14, "making-available" should be changed to -- making available --; and Column 4,
Line 63, "digital with" should be changed to -- digital map base with --.

Signed and Sealed this

Twenty-third Day of November, 2004

JON W. DUDAS
*Director of the United States Patent and Trademark Office*